United States Patent
Frank et al.

(10) Patent No.: US 10,520,205 B2
(45) Date of Patent: Dec. 31, 2019

(54) THERMOSTAT

(71) Applicants: Andrew Frank, Woodland Hills, CA (US); Paul Rauch, Sacramento, CA (US)

(72) Inventors: Andrew Frank, Woodland Hills, CA (US); Paul Rauch, Sacramento, CA (US)

(73) Assignee: Digi International Inc., Hopkins, MN (US)

( * ) Notice: Subject to any disclaimer, the term of this patent is extended or adjusted under 35 U.S.C. 154(b) by 1752 days.

(21) Appl. No.: 13/799,179

(22) Filed: Mar. 13, 2013

(65) Prior Publication Data
US 2014/0262196 A1 Sep. 18, 2014

(51) Int. Cl.
| | | |
|---|---|---|
| *F24F 11/76* | (2018.01) | |
| *F24D 19/10* | (2006.01) | |
| *G05D 22/02* | (2006.01) | |
| *G05D 23/19* | (2006.01) | |
| *G05D 27/02* | (2006.01) | |
| *G06Q 10/06* | (2012.01) | |
| *F24F 11/30* | (2018.01) | |
| *F24F 110/10* | (2018.01) | |
| *F24F 110/20* | (2018.01) | |

(52) U.S. Cl.
CPC .......... *F24D 19/1084* (2013.01); *F24F 11/30* (2018.01); *F24F 11/76* (2018.01); *G05D 22/02* (2013.01); *G05D 23/1931* (2013.01); *G05D 27/02* (2013.01); *G06Q 10/06* (2013.01); *F24F 2110/10* (2018.01); *F24F 2110/20* (2018.01)

(58) Field of Classification Search
CPC .. F24F 11/0012; F24F 11/053; F24F 11/0015; G05D 27/02; G05D 23/1931; G05D 22/02; F24D 19/1084; G06Q 10/06; F24C 19/1084

USPC ................................................. 700/276-278
See application file for complete search history.

(56) References Cited

U.S. PATENT DOCUMENTS

| | | | | |
|---|---|---|---|---|
| 3,933,197 A | * | 1/1976 | Zimmer et al. ............... 165/216 |
| 4,110,827 A | * | 8/1978 | Shavit ..................... F24F 11/00 165/205 |
| 4,553,696 A | * | 11/1985 | Ichikawa et al. ............ 236/49.3 |
| 4,835,981 A | * | 6/1989 | Rinholen ......................... 62/229 |
| 4,903,759 A | * | 2/1990 | Lapeyrouse ................. 165/11.1 |
| 5,050,394 A | * | 9/1991 | Dudley et al. ................. 62/115 |
| 5,065,585 A | * | 11/1991 | Wylie ..................... F24F 3/044 62/89 |

(Continued)

OTHER PUBLICATIONS

Persily et al., "Ventlation Desgin and Performance in U.S. Office Buidlings", 2005, American Society of Heating, Refrigerating and Air-Conditioning Engineers, pp. 30-35.*

*Primary Examiner* — Thomas C Lee
*Assistant Examiner* — Gary Collins
(74) *Attorney, Agent, or Firm* — Fogg & Powers LLC

(57) ABSTRACT

Discussed generally herein are systems and methods for comfort level regulation in a building. A comfort level regulation system for a building can include a plurality of air intakes configured to draw air into the building, and a processor configured to open the one or more air intakes of the plurality of air intakes as a function of an orientation of the building, the location of the air intake relative to the orientation of the building, air temperatures inside and outside the building, and humidity inside and outside the building.

20 Claims, 4 Drawing Sheets

(56) References Cited

U.S. PATENT DOCUMENTS

| | | | | |
|---|---|---|---|---|
| 5,179,524 A * | 1/1993 | Parker et al. | | 700/277 |
| 5,381,950 A * | 1/1995 | Aldridge | | 236/1 R |
| 5,481,481 A * | 1/1996 | Frey et al. | | 702/82 |
| 5,564,626 A * | 10/1996 | Kettler et al. | | 236/49.3 |
| 5,564,980 A * | 10/1996 | Becker | | 454/252 |
| 5,682,949 A * | 11/1997 | Ratcliffe et al. | | 165/209 |
| 5,729,474 A * | 3/1998 | Hildebrand et al. | | 700/276 |
| 5,801,940 A * | 9/1998 | Russ et al. | | 700/9 |
| 5,902,183 A * | 5/1999 | D'Souza | F24F 11/006 | 236/49.3 |
| 5,909,378 A * | 6/1999 | De Milleville | | 700/276 |
| 5,924,486 A * | 7/1999 | Ehlers | G05D 23/1923 | 165/238 |
| 6,098,893 A * | 8/2000 | Berglund et al. | | 236/51 |
| 6,123,751 A * | 9/2000 | Nelson et al. | | 95/268 |
| 6,835,128 B1 * | 12/2004 | Olson | | 454/232 |
| 7,317,970 B2 * | 1/2008 | Pienta et al. | | 700/278 |
| 7,567,844 B2 * | 7/2009 | Thomas et al. | | 700/19 |
| 7,600,694 B2 * | 10/2009 | Helt et al. | | 236/1 B |
| 8,083,154 B2 * | 12/2011 | Schultz et al. | | 236/94 |
| 8,543,244 B2 * | 9/2013 | Keeling | F24D 19/1066 | 700/276 |
| 9,717,165 B2 * | 7/2017 | Rogers | | H05K 7/20745 |
| 9,958,173 B1 * | 5/2018 | Wright | | F24F 7/007 |
| 2002/0017107 A1 * | 2/2002 | Bailey | F24F 3/001 | 62/238.7 |
| 2003/0171092 A1 * | 9/2003 | Karamanos et al. | | 454/233 |
| 2005/0234596 A1 * | 10/2005 | Rietschel | | 700/276 |
| 2006/0079172 A1 * | 4/2006 | Fleming et al. | | 454/353 |
| 2006/0099904 A1 * | 5/2006 | Belt et al. | | 454/236 |
| 2006/0111816 A1 * | 5/2006 | Spalink et al. | | 700/276 |
| 2006/0121844 A1 * | 6/2006 | Sparks, II | | 454/337 |
| 2006/0154596 A1 * | 7/2006 | Meneely, Jr. | F24F 11/0017 | 454/256 |
| 2007/0181701 A1 * | 8/2007 | Cheng et al. | | 236/49.3 |
| 2008/0015794 A1 * | 1/2008 | Eiler | F24F 3/16 | 702/33 |
| 2008/0048046 A1 * | 2/2008 | Wagner et al. | | 236/91 R |
| 2008/0179053 A1 * | 7/2008 | Kates | F24F 3/044 | 165/208 |
| 2008/0237511 A1 * | 10/2008 | Heyden et al. | | 251/57 |
| 2009/0076658 A1 * | 3/2009 | Kinnis | F24F 11/0001 | 700/277 |
| 2009/0101727 A1 * | 4/2009 | Boudreau | | 236/44 C |
| 2009/0199580 A1 * | 8/2009 | Lyon | | 62/157 |
| 2009/0215375 A1 * | 8/2009 | Hagensen | | 454/42 |
| 2009/0240381 A1 * | 9/2009 | Lane | H02J 3/14 | 700/296 |
| 2010/0015906 A1 * | 1/2010 | Takahashi | F24F 7/06 | 454/258 |
| 2010/0036533 A1 * | 2/2010 | Masuda et al. | | 700/276 |
| 2010/0078492 A1 * | 4/2010 | Cislo | F24F 7/06 | 236/49.3 |
| 2010/0088261 A1 * | 4/2010 | Montalvo | H02J 3/14 | 706/15 |
| 2010/0139306 A1 * | 6/2010 | Krenik | F25B 9/004 | 62/402 |
| 2010/0198411 A1 * | 8/2010 | Wolfson | G05B 15/02 | 700/275 |
| 2010/0211224 A1 * | 8/2010 | Keeling | F24D 19/1066 | 700/277 |
| 2010/0235005 A1 * | 9/2010 | Stockton | | 700/278 |
| 2010/0312397 A1 * | 12/2010 | George | G05D 22/02 | 700/277 |
| 2011/0040412 A1 * | 2/2011 | Wiese | | 700/275 |
| 2011/0046790 A1 * | 2/2011 | Miller et al. | | 700/276 |
| 2011/0146582 A1 * | 6/2011 | Lemmon et al. | | 119/448 |
| 2011/0172831 A1 * | 7/2011 | Kreft et al. | | 700/278 |
| 2011/0190945 A1 * | 8/2011 | Yoshii et al. | | 700/277 |
| 2011/0253359 A1 * | 10/2011 | Stockton | F24F 11/0001 | 165/250 |
| 2011/0270446 A1 * | 11/2011 | Scharf | F24F 11/0001 | 700/282 |
| 2012/0071082 A1 * | 3/2012 | Karamanos | F24F 5/0003 | 454/284 |
| 2012/0089257 A1 * | 4/2012 | Holger | | 700/278 |
| 2012/0216982 A1 * | 8/2012 | Lee | F24F 11/001 | 165/11.1 |
| 2013/0013121 A1 * | 1/2013 | Henze | G06Q 10/04 | 700/291 |
| 2013/0040550 A1 * | 2/2013 | Pfister | F24F 11/0001 | 454/239 |
| 2013/0289778 A1 * | 10/2013 | Ishizaka | | 700/276 |
| 2014/0156083 A1 * | 6/2014 | Burke | | 700/276 |
| 2014/0206278 A1 * | 7/2014 | Stevenson | F24F 11/76 | 454/343 |

* cited by examiner

THERMOSTAT

BACKGROUND

Thermostats can use control algorithms that can react to temperature data sensed by temperature sensors. Thermostats can adjust control of a Heating Ventilation and Air Conditioning (HVAC) system based on this data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
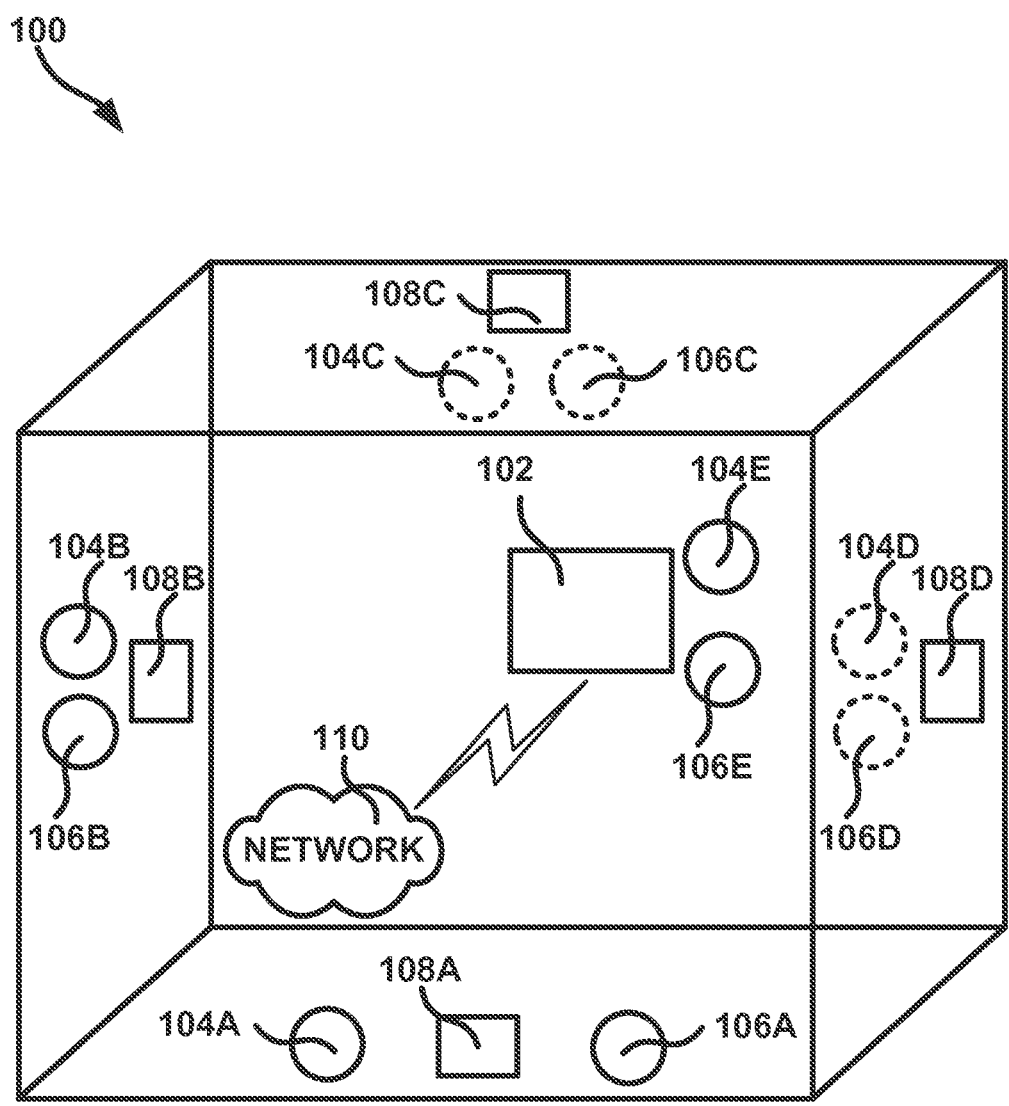
FIG. 1 illustrates a block diagram an example of a comfort level system in an area.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Discussed generally herein are systems and methods for comfort level regulation in a building. A comfort level regulation system for a building or an area of the building can include a plurality of air vents (e.g., air intakes or air outtakes) configured to draw air into the building, and a processor configured to open the one or more air vents of the plurality of air intakes as a function of an orientation of the building, the location of the air vent relative to the orientation of the building, the time of the day, the usage of the area at a given time, air temperatures inside and outside the building, and humidity inside and outside the building.

A thermostat can use weather data available from the internet, including outside ambient temperature, relative humidity, and periodic (e.g., hourly) forecasts. The thermostat can use outside ambient data including temperature or humidity obtained using remote sensing units. The remote sensing units can be connected to a wired or wireless network, such as a Zigbee® network. The thermostat can use the temperature or humidity data of an area (e.g., room) in a building. The thermostat can use data about an HVAC system of the building, square footage of the area or building, number of stories of the building, type of insulation used in the area or building, or composition of the area or building (e.g., wood, brick, stone, etc.) to predict how the thermostat should control the HVAC system to maintain a comfort level, reduce energy usage, or both.

The thermostat can use this information to determine when to open or close an air vent of the area or building. The thermostat can use the temperature information it receives from sensors and internet, among others, to determine a crossover point of inside air temperature and outside air temperature. The thermostat can use this crossover point to refresh or freshen air inside the building without significantly impacting the inside air temperature, such as by determining that the outside and inside air temperature are substantially equal (e.g., within about two degrees of each other) and opening one or more air vents. The thermostat can be configured to heat, cool, or reduce humidity to maintain a comfort level or can adjust the comfort level (e.g., temperature set point) slightly to reduce energy expenditure. An advantage of adjusting the comfort level can include energy savings compared to thermostats that maintain the same set point and vary heating and cooling cycles to reach those set points.

A thermostat can include a "comfort setting" and a separate "temperature setting" (e.g., temperature set point). A person's comfort level can be a function of humidity and temperature. A person may feel warmer in a more humid environment because the body can evaporate less moisture and the same person may feel cooler in a lower humidity environment. The thermostat may decrease the temperature set point of an area or building when the humidity is above a certain threshold or increase the temperature set point of an area or building when the humidity is below a specified threshold. The thermostat may open or close an air intake as a function of data received from humidity sensors inside and outside of an area or building. For example, if the humidity outside the building is higher than the humidity inside the building, the thermostat may leave an air intake closed or close an air intake to help preserve the comfort level inside the building. Or, if the humidity inside the building is higher than the humidity outside the building the thermostat may leave an air intake open or open an air intake to help attain a specified comfort level inside the building.

The weather data could be used by the thermostat differently in different climates. For example, in a hot, dry environment where the mornings and evenings are relatively cool and the daytime temperature is hot, the thermostat may lower the temperature in the area or building ("pre-cool") while the outside air is still cooler than the air in the area or building with fresh air from outside (e.g., when the outside air temperature is within about two degrees of the inside air temperature). Such a configuration can increase the amount of time it takes for the inside air temperature to rise above a temperature set point of the inside air. A similar technique can be implemented when the temperature is dropping in the evening. The area or building may retain heat gained from the daytime heat and the thermostat can post-cool the area or building with fresh, cooler outside air. In a situation where the outside air temperature is higher than the inside air temperature (e.g., by up to about two degrees) and the temperature set point of the thermostat is higher than the inside air temperature, the thermostat can open an air vent to pre-heat the area or building with outside air.

Referring now to FIG. 1, a comfort level system 100 for an area (e.g., room, building, or other indoor space) can include one or more thermostats 102, one or more temperature sensors 104A-E, one or more humidity sensors 106A-E, and one or more air intakes 108A-D. Humidity and temperature sensing may be implemented in the same package.

For example temperature sensor 104A and humidity sensor 106A may be implemented in a single package.

The thermostat 102 may be wired or wirelessly coupled to the temperature sensors 104A-E, humidity sensors 106A-E, and air intakes 108A-D. The thermostat 102 can receive air temperature information (e.g., data representative of a temperature of air) directly from the temperature sensors 104A-E or from a network 110 which the temperature sensors 104A-E are communicatively coupled to. Similarly, the thermostat 102 can receive air humidity information (e.g., data representative of a humidity of air) directly from the humidity sensors 106A-E or from a network 110 which the humidity sensors 106A-E are communicatively coupled to.

The thermostat 102 can include one or more temperature set points that can be set by a user. The one or more temperature set points can be set on a schedule. For example, a user can decide that they would like an area to be warmer during the day than at night. In such a situation, the user could set a first temperature set point for 7:00 AM and a second different temperature set point for 11:00 PM. The thermostat 102 can use the first temperature set point as the desired temperature of the area from 7:00 AM to 11:00 PM and the second temperature set point as the desired temperature for the area from 11:00 PM to 7:00 AM. Temperature set points could be set for longer or shorter lengths of time, such as hourly, daily, weekly, monthly, etc. Temperature set points can be set based on solar activity, such as sunrise, sunset, or how much sun exposure the area is exposed to (e.g., mostly sunny, partly cloudy, etc.), among others. Information about solar activity can be retrieved through the network 110. The user may set a maximum temperature deviation form the set points that can be used for pre or post heating or cooling of the area or building.

The thermostat 102 can include a global positioning system (GPS) sensor that it can use to determine (e.g., automatically determine) its location. The location can be used to determine weather data, such as through the internet. The thermostat 102 can use Internet Protocol (IP) address information, cell tower information, GPS, or any other wired or wireless method to determine its geographic location.

One or more air temperature sensors 104A-E can be communicatively coupled to the thermostat 102. The temperature sensors 104 can transmit data representative of an air temperature to the thermostat 102 either directly to the thermostat 102 or indirectly, such as through network 110. The temperature sensor 104 can be configured to transmit temperature air temperature data periodically, continuously, or at or around the time the thermostat 102 requests temperature data. One or more temperature sensors 104 can be placed inside an area to measure inside air temperature and transmit an inside air temperature data to the thermostat 102, such as temperature sensor 104E of FIG. 1. In one or more embodiments, more than one temperature sensor 104 may be placed in different locations in the same area, such as an area with a large volume. One or more temperature sensors 104 can be placed outside an area to measure outside air temperature and transmit an outside air temperature to the thermostat 102. In the embodiment shown in FIG. 1, temperature sensors 104A-D measure outside air temperature and transmit data representative of outside air temperature to the thermostat 102.

One or more air humidity sensors 106A-E can be communicatively coupled to the thermostat 102. The humidity sensors 106 can transmit data representative of an air humidity to the thermostat 102, either directly to the thermostat 102 or indirectly, such as through network 110. The humidity sensor 106 can be configured to transmit air humidity data periodically, continuously, or at or around the time the thermostat 102 requests humidity data. One or more humidity sensors 106 can be placed inside an area to measure inside air humidity and transmit inside air humidity data to the thermostat 102. Humidity sensor 106E of FIG. 1 shows an example of an inside air humidity sensor 106. In one or more embodiments, more than one humidity sensor 106 may be placed in different locations in the same area, such as an area with a large volume. One or more humidity sensors 106 can be placed outside an area to measure outside air humidity and transmit an outside air humidity to the thermostat 102. In the embodiment shown in FIG. 1, humidity sensors 106A-D measure outside air humidity and transmit data representative of outside air humidity to the thermostat 102.

One or more air vents 108A-D (e.g., air intakes or air outtakes) can be communicatively coupled to the thermostat 102. The air intakes 108A-D may each include a corresponding actuator. The thermostat 102 can control the actuator through electrical signals. The actuator can, at least partially, open or close a cover of the air vent 108. In such a configuration, the thermostat 102 can control how much air flows into or out of an area through the air intake(s) 108. For example, one or more air vents 108 can be positioned near a ceiling of an area to let hot air escape and one or more air vents 108 can be positioned near a floor of an area to let outside air in. Air vents 108 can include fans or other such mechanisms for pulling air into and out of an area. Air vents can be positioned in different sides of the building to take advantage of the various micro climates around building (e.g., sun exposure, shade from foliage or structures around the building, or temperature deviations due to nearby water, or the like).

Figure 4:
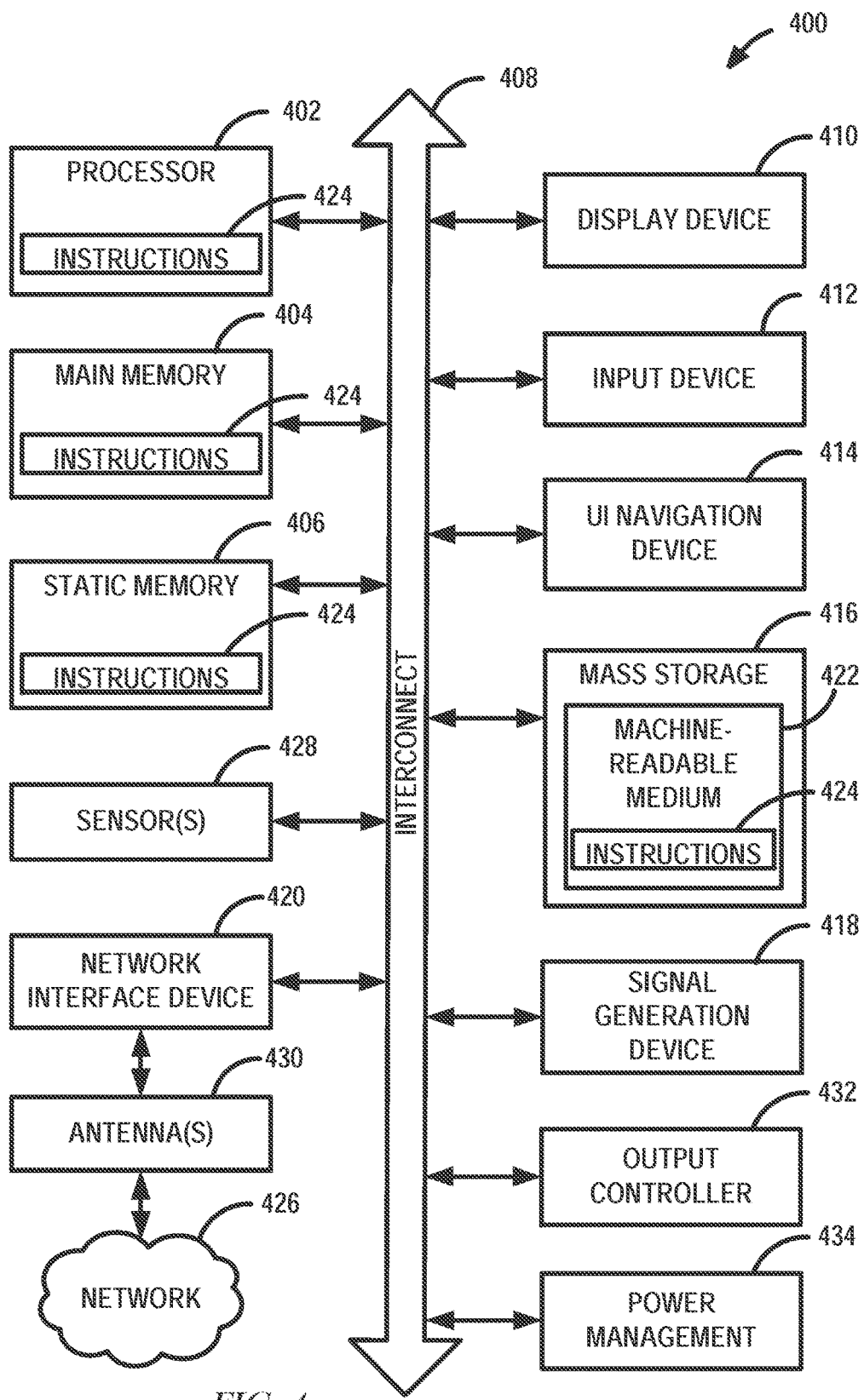
FIG. 4 illustrates a block diagram of an example of a computer system.

Network 110 can be communicatively coupled to the thermostat 102, temperature sensors 104A-E, humidity sensors 106A-E, air vents 108A-D, or computer system(s) 400 (shown in FIG. 4). The network 110 can be configured to relay temperature, humidity, orientation of air vent 108, weather forecast (e.g., a predicted temperature, humidity, whether it will rain, snow, or storm, or other weather forecast information) to the thermostat 102.

Figure 2:
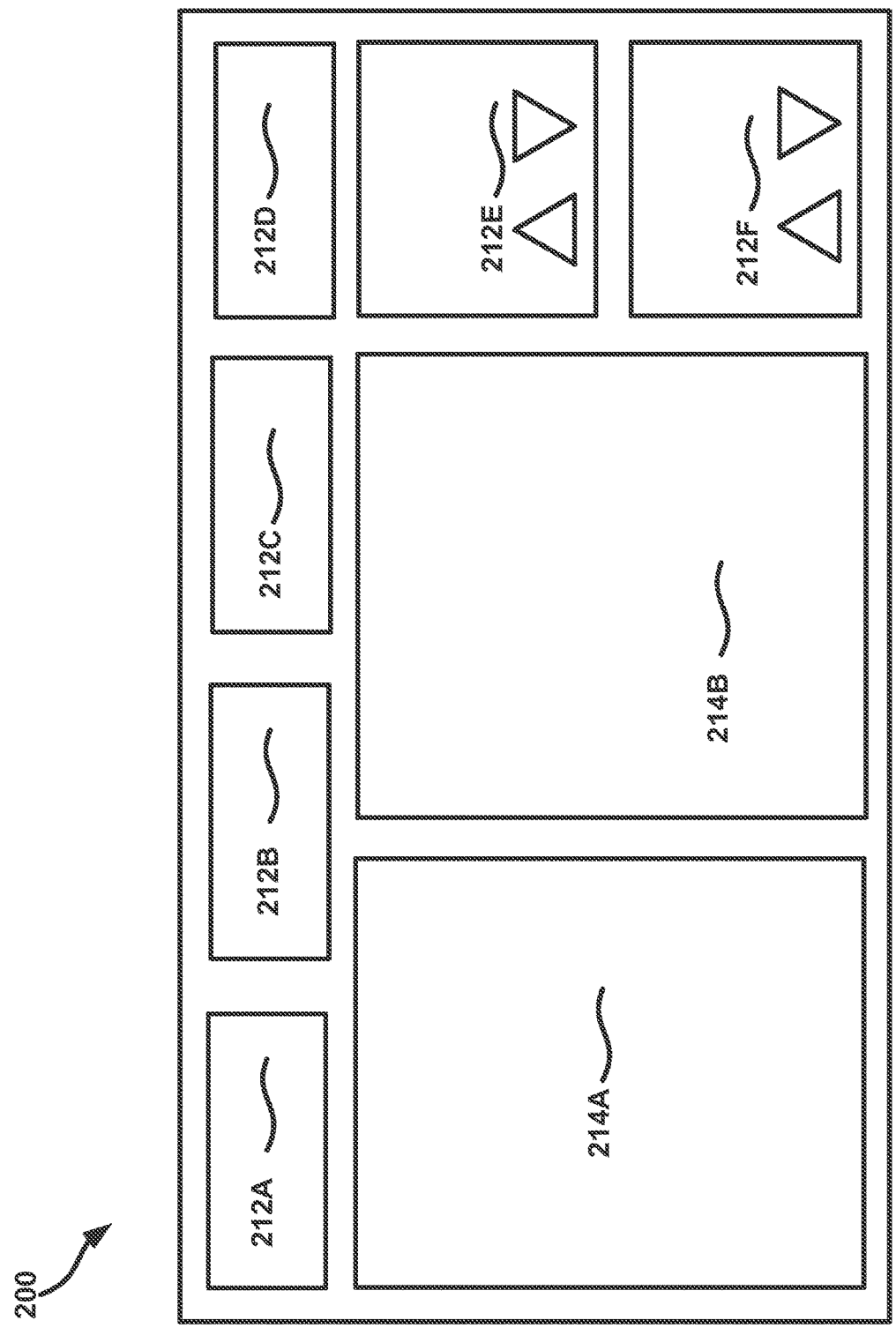
FIG. 2 illustrates a block diagram of an example of a user-interface of a thermostat.

FIG. 2 shows an example of a user interface 200 of a thermostat 102. The user interface 200 can include one or more settings buttons 212A-F and one or more information screens 214A-B. The settings buttons 212 can correspond to configuring what is displayed on the information screens 214, heating or cooling settings, system information and configuration options, or ventilation options, among others. For example, a user can configure the temperature set points of the thermostat 102 using the heating or cooling settings. In one or more embodiments, a user can set a temperature set point that indicates when the thermostat 102 should initiate heating an area and another temperature set point that indicates when the thermostat 102 should initiate cooling an area, such as by using the up and down arrows of settings buttons 212E and 212F, respectively. The thermostat 102 may include a limited user interface, or no user interface and be controlled remotely via an application, such as a smartphone application.

The user can set a temperature schedule through the user interface 200. The user can enter information about the area the thermostat 102 is responsible for through the user interface 200. For example, the user can enter data about the insulation used in the area, a square footage of the area, a website that the network 110 can pull weather data from, a zip code or other information indicating a geographical location of the area, or other area information through the user interface 200. The user can indicate whether they desire the thermostat 102 to pre or post heat or pre or post cool the area with outside air using the air vents 108 or using a heater or air conditioner of the area.

The information screen(s) 214 can display a temperature received from a temperature sensor 104, a humidity received from a humidity sensor 106, an indoor or outdoor temperature, a weather forecast, the temperature set point(s), the status of an air vent 108 (e.g., whether an air vent 108 is opened, closed, or partially opened or closed), or other system information.

Figure 3:
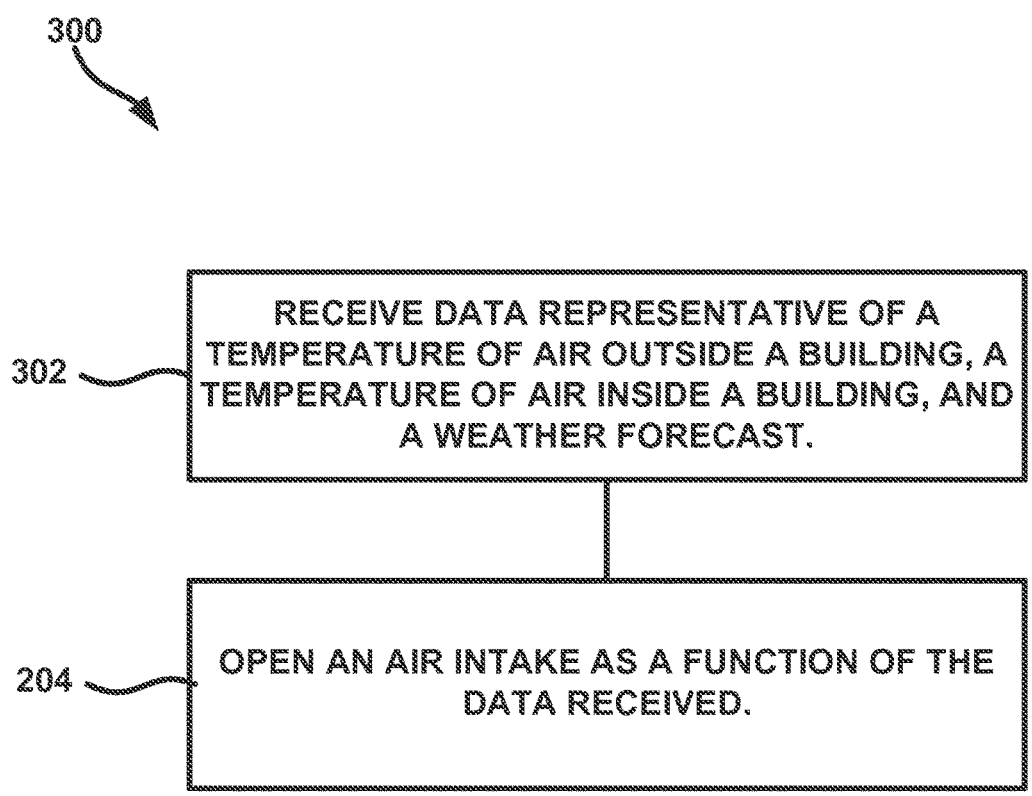
FIG. 3 illustrates a flow diagram of an example of a technique

FIG. 3 shows an example of a technique 300 for pre or post heating or pre or post cooling an area. At 302, data representative of a temperature of air outside a building, a temperature of air inside a building, or a weather forecast can be received at a network 110 or a thermostat 102. At 304, an air vent 108 can be opened as a function of the data received. For example, an air vent 108 can be opened, using the thermostat 102, to pre-heat the air inside the building when data representative of the weather forecast indicates that the temperature of air outside the building will be less than a temperature set point of the thermostat 102 later in the day and the data representative of the temperature of air outside the building is currently greater than the temperature set point (e.g., by up to about a few degrees).

FIG. 4 is a block diagram illustrating an example computer system machine upon which any one or more of the techniques herein discussed may be run, such as a computer system 400 that can be communicatively coupled to a thermostat 102. In one or more embodiments, thermostat 102 includes one or more items of computer system 400. Computer system 400 may be embodied as a computing device, providing operations of a thermostat 102 (from FIG. 1), or any other processing or computing platform or component described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The computer system machine may be a personal computer (PC) that may or may not be portable (e.g., a notebook or a netbook), a tablet, a set-top box (STB), a gaming console, a Personal Digital Assistant (PDA), a mobile telephone or Smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 400 includes a processor 402 (e.g., a central processing unit (CPU), a graphics processing unit (GPU) or both), a main memory 404 and a static memory 406, which communicate with each other via an interconnect 408 (e.g., a link, a bus, etc.). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are a touch screen display. The computer system 400 may additionally include a storage device 416 (e.g., a drive unit), a signal generation device 418 (e.g., a speaker), an output controller 432, a power management controller 434, and a network interface device 420 (which may include or operably communicate with one or more antennas 430, transceivers, or other wireless communications hardware), and one or more sensors 428, such as a GPS sensor, compass, location sensor, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Additional Notes and Examples

In Example 1, a temperature or comfort regulation system of an area (e.g., room or building) includes a first fresh air vent (e.g., air intake) configured to move outside air into the area through a first side of the area.

In Example 2, the system of Example 1 includes a second fresh air vent configured to move outside air into the area through a second side of the area different from the first side of the area.

In Example 3, the system of at least one of Examples 1-2 includes a first temperature sensor configured to detect a first air temperature of air outside the first side of the area.

In Example 4, the system of at least one of Examples 1-3 includes a second temperature sensor configured to detect a second air temperature of air outside the second side of the area.

In Example 5, the system of at least one of Examples 1-4 includes a third temperature sensor configured to detect a third air temperature, the third temperature is a temperature of air inside the area.

In Example 6, the system of at least one of Examples 1-5 includes a thermostat communicatively coupled to the first temperature sensor, second temperature sensor, third temperature sensor, first fresh air vent, and second fresh air vent, the thermostat includes a temperature set point, and is configured to (1) open the first fresh air vent as a function of the first air temperature, third air temperature, and the temperature set point, and (2) open the second fresh air vent as a function of the second air temperature, third air temperature, and the temperature set point.

In Example 7, the thermostat of at least one of Examples 1-6 is communicatively coupled to a database including current weather data and weather forecasts and wherein the thermostat is further configured to (1) open the first fresh air vent as a function of the current weather and weather forecasts, or (2) open the second fresh air vent as a function of the current weather and weather forecasts.

In Example 8, the system of at least one of Examples 1-7 includes a first humidity sensor configured to detect a first air humidity of air outside the first side of the area.

In Example 9, the system of at least one of Examples 1-8 includes a second humidity sensor configured to detect a second air humidity of air outside the second side of the area.

In Example 10, the system of at least one of Examples 1-9 includes a third humidity sensor configured to detect a third air humidity, the third air humidity is a humidity of air inside the area.

In Example 11, the thermostat of at least one of Examples 1-10 is configured to (1) open the first fresh air vent when the first air humidity sensor indicates that the humidity of air outside the first side of the area is less than the humidity of air inside the area, and (2) open the second fresh air vent when the second air humidity sensor indicates that the humidity of air outside the second side of the area is less than the humidity of air inside the area.

In Example 12, the thermostat of at least one of Examples 1-11 is configured to pre-cool the air inside the area by opening the first or second fresh air vent when one or more of the weather forecasts indicates that the temperatures outside the first or second sides of the area will be higher than the temperature set point later in the day and the first or second air temperature sensor indicates that the temperature of the air outside the first or second side of the area is currently less than the temperature set point.

In Example 13, the thermostat of at least one of Examples 1-12 is configured to pre-heat the air inside the area by opening the first or second fresh air vent when one or more of the weather forecasts indicates that the temperatures outside the first and second sides of the area will be lower than the temperature set point later in the day and the first or second air temperature sensor indicates that the temperature of the air outside the first or second side of the area is currently greater than the temperature set point.

In Example 14, the thermostat of at least one of Examples 1-13 is configured to open the first fresh air vent when the difference in air temperature outside the first side of the area is within about two degrees of the temperature set point.

In Example 15 a temperature or comfort regulation system for an area (e.g., room or building) includes a plurality of air vents (e.g., air intakes or air outtakes) configured to draw air into the area.

In Example 16, the system of at least one of Examples 1-15 includes a processor configured to open one or more air vents of the plurality of air vents as a function of an orientation of the area, the location of the air vent relative to the orientation of the area, air temperatures inside and outside the area, and humidity inside and outside the area.

In Example 17, the processor of at least one of Examples 1-16 is configured to open the one or more air vents as a function of a weather forecast.

In Example 18, the processor of at least one of Examples 1-17 is configured to open an air vent of the plurality air vents when the weather forecast indicates that the temperature outside the area is going to be greater than a temperature set point of a thermostat and an air temperature of the air temperatures outside the area is less than the temperature set point.

In Example 19, the processor of at least one of Examples 1-18 is configured to open an air vent of the plurality of air vents when the temperature outside the area is within zero to two degrees of the temperature inside the area.

In Example 20, the processor of at least one of Examples 1-19 is configured to open an air vent of the plurality air vents when the weather forecast indicates that the temperature outside the area is going to be less than a temperature set point of a thermostat and an air temperature of the air temperatures outside the area is greater than the temperature set point.

In Example 21, the processor of at least one of Examples 1-20 is configured to open an air vent of the plurality of air vents when the temperature outside the area is within zero to two degrees of the temperature set point.

In Example 22, the processor of at least one of Examples 1-21 is configured to open an air vent of the plurality of air vents when the humidity outside the area is less than the humidity inside the area.

In Example 23, a technique of regulating a comfort or temperature level inside an area includes receiving, at a thermostat, data representative of a temperature of air outside the area, a temperature of air inside the area, and a weather forecast.

In Example 24, the technique of at least one of Examples 1-23 includes opening an air vent, using the thermostat, to pre-heat the air inside the area when data representative of the weather forecast indicates that the temperature of air outside the area will be less than a temperature set point of the thermostat later in the day and the data representative of the temperature of air outside the area is currently greater than the temperature set point.

In Example 25, opening the air vent to pre-heat the air inside the area of at least one of Examples 1-24 includes opening the air vent when the data representative of the temperature of air outside the area indicates the temperature of air outside the area is currently within zero to two degrees of the temperature set point.

In Example 26, the technique of at least one of Examples 1-25 includes opening an air vent, using the thermostat, to pre-cool the air inside the area when the data representative of the weather forecast indicates that that the temperature of air outside the area will be greater than the temperature set point later in the day and the data representative of the temperature of air outside the area indicates the temperature of air outside the area is currently less than the temperature set point.

In Example 27, opening the air vent to pre-cool the air inside the area of at least one of Examples 1-26 includes opening the air vent when the data representative of the temperature of air outside the area indicates the temperature of air outside the area is currently within zero to two degrees of the temperature set point.

In Example 28, the technique of at least one of Examples 1-27 includes receiving, at the thermostat, data representative of a humidity of the air outside the area and a humidity of the air inside the area.

In Example 29, the technique of at least one of Examples 1-28 includes opening the air vent when the data representative of the humidity of the air outside the area indicates the humidity of the air outside the area is less than the humidity of the air inside the area.

In Example 30, receiving data representative of a temperature of air outside the area of at least one of Examples 1-29 includes receiving, from a first temperature sensor, data representative of a first temperature of air outside a first side of the area and receiving, from a second temperature sensor, data representative of a second temperature of air outside a second side of the area different than the first side of the area.

In Example 31, opening an air vent to pre-heat the air inside the area of at least one of Examples 1-30 includes opening a first air vent on the first side of the area when data representative of the weather forecast indicates that the temperature of air outside the area will be less than a temperature set point of the thermostat later in the day and the data representative of the temperature of air outside the first side of the area indicates that the temperature outside the first side of the area is currently greater than the temperature set point.

In Example 32, opening an air vent to pre-heat the air inside the area of at least one of Examples 1-31 includes opening a second air vent on the second side of the area when data representative of the weather forecast indicates that the temperature of air outside the area will be less than a temperature set point of the thermostat later in the day and the data representative of the temperature of air outside the second side of the area indicates that the temperature outside the second side of the area is currently greater than the temperature set point.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A temperature regulation system for a building comprising:
    a first fresh air intake configured to move outside air into the building through a first side of the building;
    a second fresh air intake configured to move outside air into the building through a second side of the building different from the first side of the building;
    a first temperature sensor configured to detect a first air temperature of air outside the first side of the building;
    a second temperature sensor configured to detect a second air temperature of air outside the second side of the building;
    a third temperature sensor configured to detect a third air temperature, the third temperature is a temperature of air inside the building; and
    a thermostat communicatively coupled to the first temperature sensor, the second temperature sensor, the third temperature sensor, the first fresh air intake, and the second fresh air intake, the thermostat includes a temperature set point, and is configured to (1) open the first fresh air intake as a function of the first air temperature, the third air temperature, and the temperature set point, and (2) open the second fresh air intake as a function of the second air temperature, the third air temperature, and the temperature set point.

2. The system of claim 1, wherein the thermostat is communicatively coupled to a database including current weather data and weather forecasts and wherein the thermostat is further configured to (1) open the first fresh air intake as a function of the current weather and weather forecasts, and (2) open the second fresh air intake as a function of the current weather and weather forecasts.

3. The system of claim 1, further comprising:
    a first humidity sensor configured to detect a first air humidity of air outside the first side of the building;
    a second humidity sensor configured to detect a second air humidity of air outside the second side of the building;
    a third humidity sensor configured to detect a third air humidity, the third air humidity is a humidity of air inside the building.

4. The system of claim 3, wherein the thermostat is configured to (1) open the first fresh air intake when the first air humidity sensor indicates that the humidity of air outside the first side of the building is less than the humidity of air inside the building, and (2) open the second fresh air intake when the second air humidity sensor indicates that the humidity of air outside the second side of the building is less than the humidity of air inside the building.

5. The system of claim 1, wherein the thermostat is configured to pre-cool the air inside the building by opening one or more of the first and second fresh air intakes when one or more weather forecasts indicates that the temperatures outside the first and second sides of the building will be higher than the temperature set point later in a day and the first or second air temperature sensor indicates that the temperature of the air outside the first or second side of the building is currently less than the temperature set point.

6. The system of claim 1, wherein the thermostat is configured to pre-heat the air inside the building by opening one or more of the first and second fresh air intakes when one or more weather forecasts indicates that the temperatures outside the first and second sides of the building will be lower than the temperature set point later in a day and the first or second air temperature sensor indicates that the temperature of the air outside the first or second side of the building is currently greater than the temperature set point.

7. The system of claim 6, wherein the thermostat is configured to open one or more of the first and second fresh air intakes when a difference in air temperature outside the first side of the building is within two degrees of the temperature set point.

8. A comfort regulation system for a building comprising:
    a plurality of air intakes configured to draw air into the building;

a processor configured to open one or more air intakes of the plurality of air intakes as a function of an orientation of the building, a location of each air intake relative to the orientation of the building, air temperatures inside and outside the building, and humidity inside and outside the building.

9. The system of claim 8, wherein the processor is further configured to open the one or more air intakes as a function of a weather forecast.

10. The system of claim 9, wherein the processor is configured to open an air intake of the plurality air intakes when the weather forecast indicates that the temperature outside the building is going to be greater than a temperature set point of a thermostat and an air temperature of the air temperatures outside the building is less than the temperature set point.

11. The system of claim 9, wherein the processor is configured to open an air intake of the plurality air intakes when the weather forecast indicates that the temperature outside the building is going to be less than a temperature set point of a thermostat and an air temperature of the air temperatures outside the building is greater than the temperature set point.

12. The system of claim 8, wherein the processor is configured to open an air intake of the plurality of air intakes when the temperature outside the building is within two degrees of the temperature set point.

13. The system of claim 8, wherein the processor is configured to open an air intake of the plurality of air intakes when the temperature outside the building is within two degrees of the temperature inside the building.

14. The system of claim 8, wherein the processor is configured to open one or more air intake of the plurality of air intakes when the humidity outside the building is less than the humidity inside the building.

15. A method of regulating a comfort level inside a building comprising:
receiving, at a thermostat, data representative of a temperature of air outside the building, a temperature of air inside the building, and a weather forecast; and
opening an air intake, using the thermostat, to pre-heat the air inside the building when data representative of the weather forecast indicates that the temperature of air outside the building will be less than a temperature set point of the thermostat later in a day and the data representative of the temperature of air outside the building is currently greater than the temperature set point.

16. The method of claim 15, further comprising freshening the air inside the building by opening the air intake when the data representative of the temperature of air outside the building indicates the temperature of air outside the building is currently within two degrees of the temperature set point.

17. The method of claim 15, further comprising:
opening an air intake, using the thermostat, to pre-cool the air inside the building when the data representative of the weather forecast indicates that that the temperature of air outside the building will be greater than the temperature set point later in the day and the data representative of the temperature of air outside the building indicates the temperature of air outside the building is currently less than the temperature set point.

18. The method of claim 15, freshening the air inside the building by opening the air intake when the data representative of the temperature of air outside the building indicates the temperature of air outside the building is currently within two degrees of the temperature inside the building.

19. The method of claim 15, further comprising:
receiving, at the thermostat, data representative of a humidity of the air outside the building and a humidity of the air inside the building; and
opening the air intake when the data representative of the humidity of the air outside the building indicates the humidity of the air outside the building is less than the humidity of the air inside the building.

20. The method of claim 15, wherein receiving data representative of a temperature of air outside the building includes receiving, from a first temperature sensor, data representative of a first temperature of air outside a first side of the building and receiving, from a second temperature sensor, data representative of a second temperature of air outside a second side of the building different than the first side of the building; and
wherein opening an air intake to pre-heat the air inside the building includes (1) opening a first air intake on the first side of the building when data representative of the weather forecast indicates that the temperature of air outside the building will be less than a temperature set point of the thermostat later in the day and the data representative of the temperature of air outside the first side of the building indicates that the temperature outside the first side of the building is currently greater than the temperature set point and (2) opening a second air intake on the second side of the building when data representative of the weather forecast indicates that the temperature of air outside the building will be less than a temperature set point of the thermostat later in the day and the data representative of the temperature of air outside the second side of the building indicates that the temperature outside the second side of the building is currently greater than the temperature set point.

* * * * *